United States Patent [19]

Domingorena et al.

[11] Patent Number: 4,479,727
[45] Date of Patent: Oct. 30, 1984

[54] APPARATUS AND METHOD FOR EVALUATING THE PERFORMANCE OF A HEAT EXCHANGER

[75] Inventors: Albert A. Domingorena, Liverpool; Donald G. Rich, Fayetteville; John D. Manning, Liverpool, all of N.Y.

[73] Assignee: Carrier Corporation, Syracuse, N.Y.

[21] Appl. No.: 413,853

[22] Filed: Sep. 1, 1982

[51] Int. Cl.³ .................................... G01N 25/00
[52] U.S. Cl. ...................................... 374/45; 374/43; 165/66
[58] Field of Search .................. 374/43, 44, 45, 39, 374/7, 40; 73/112; 165/11 R, 66, DIG. 12

[56] References Cited

U.S. PATENT DOCUMENTS

| | | | |
|---|---|---|---|
| 1,124,160 | 1/1915 | McGrary | 165/66 |
| 3,273,356 | 9/1966 | Hoffman | 165/66 |
| 3,654,432 | 4/1972 | Dyre | 165/66 |
| 3,799,250 | 3/1974 | Dyre | 165/66 |
| 3,918,300 | 11/1975 | Weisstuch et al. | |
| 4,024,751 | 5/1977 | Potrzebowski | |

Primary Examiner—Charles Frankfort
Assistant Examiner—David R. Schuster
Attorney, Agent, or Firm—David J. Zobkiw

[57] ABSTRACT

A method and apparatus for evaluting the performance of a heat exchanger are described. Water is supplied to the heat exchanger at a known mass flow rate and temperature. The water is directed to traverse a flow path of the heat exchanger. The water is then heated and redirected into another flow path of the heat exchanger in heat exchange relation with the first flow path. The temperature change of the water over a flow path is measured to determine the performance of the heat exchange. The water flow rate and incoming water temperature may be fixed to make a single discharge temperature measurement sufficient to calculate heat exchager performance.

11 Claims, 2 Drawing Figures

4,479,727

APPARATUS AND METHOD FOR EVALUATING THE PERFORMANCE OF A HEAT EXCHANGER

BACKGROUND OF THE INVENTION

1. Field of the Invention

The present invention relates to apparatus and a method for evaluating the performance of a heat exchanger. More particularly, the present invention concerns evaluating the heat transfer performance of a tube in tube type heat exchanger.

2. Description of the Prior Art

In many vapor compression refrigeration systems it has been found advantageous to exchange heat energy between refrigerant and water. One efficient type of heat exchanger for accomplishing this heat exchange is a tube in tube coaxial heat exchanger wherein an inner tube is mounted within an outer tube. When used in a refrigeration circuit the heat exchanger is connected to allow water to flow through the inner tube and refrigerant to flow through the outer tube such that heat energy may be transferred between the two.

An application for such a device may be found in the use of a water source heat pump wherein the water acting as a heat source in the heating mode is supplied through the outer tube of the heat exchanger or acting as the cooling sink in the cooling mode is supplied through the same portion of the heat exchanger. Another application could be the heating or chilling of water for either a hydronic cooling system or for a hot water heating system. The utilization of this type of heat exchanger as a combination refrigerant desuperheater and hot water preheater is also known in the industry. Such an application allows superheat energy contained in the refrigerant to be utilized for preheating hot water for a domestic hot water supply when an air conditioner is operating in the cooling mode.

It is particularly efficient to have tube in tube heat exchangers mounted within foamed insulation such that heat transfer between the outer tube and the ambient is prevented. A problem identified with such a heat exchanger is that it is difficult to evaluate the performance of the heat exchanger after foam insulation is supplied to surround the heat exchanger. In order to evaluate the heat transfer between the inner tube and the outer tube a specific scheme as set forth herein was developed.

The invention as set forth herein concerns supplying water at a predetermined temperature and flow rate to the inner tube of the heat exchanger. The water is then circulated through the inner tube of the heat exchanger and discharged into a separate heating unit at the other end of the heat exchanger. This separate heating unit contains heaters which act to supply thermal energy to the water at a constant rate. The now heated water is supplied to the outer tube of the heat exchanger and is circulated through the outer tube of the heat exchanger. Since the entering water temperature to the inner tube is controlled and the heat energy supplied between the inner tube and the outer tube is known, the overall amount of heat energy transferred between the inner and outer tubes may be calculated as a function of known constants and the temperature of the water being discharged from the inner tube. Hence, by the measurement of a single temperature it is possible to determine whether or not the heat transfer performance of the heat exchanger is suitable.

SUMMARY OF THE INVENTION

It is an object of the present invention to provide apparatus for measuring the performance of a heat exchanger.

It is a further object of the present invention to provide a method of determining the heat transfer rate between the inner and outer tubes of a tube in tube heat exchanger.

It is a yet further object of the present invention to provide means for determining whether or not a tube in tube heat exchanger is adequate to meet a particular heat transfer requirement.

It is another object of the present invention to provide a method and apparatus serving as in incoming quality control procedure for evaluating heat exchangers.

Another object of the present invention is to provide a safe, economical, simple and reliable method of evaluating the performance of a heat exchanger.

Other objects will be apparent from the description to follow and from the appended claims.

These and other objects are achieved according to a preferred embodiment of the invention wherein there is disclosed a method of measuring the heat transfer performance of a tube in tube heat exchanger having an inner tube defining a first flow path and an outer tube defining a second flow path. Heat transfer fluid is supplied to a tube of the heat exchanger at a known mass flow rate. The heat transfer fluid is received from the tube and heat energy is added to the fluid at a known rate. The fluid is then directed into the other tube of the heat exchanger in heat exchange relation with the first tube such that heat energy is transferred between the two. The temperature change of the fluid between the inlet and the outlet of one of the tubes is then determined, said temperature being indicative of the heat transfer rate between the two tubes.

Apparatus for use in evaluating the performance of a tube in tube heat exchanger having a first flow path and a second flow path is further disclosed. The apparatus includes means for connecting a water supply to the first flow path of the heat exchanger and means for receiving water from the first flow path of the heat exchanger. Said means for receiving water including means for directing said water into the second flow path of the heat exchanger and including a heat source for supplying heat energy at a known rate to the water between the first and second flow paths. Temperature detection means is provided for ascertaining the temperature change of the water along a flow path of the heat exchanger, said temperature change being indicative of the heat energy transferred between the first and second flow path of the heat exchanger. A heat source for heating the water between the first and second paths of the heat exchanger includes a heating unit within a water flow path including electric immersion heaters for supplying heat energy to the water at a known rate, said heating unit being insulated to reduce heat transfer to the ambient from the heating unit.

DESCRIPTION OF THE PREFERRED EMBODIMENT

Figure 1:
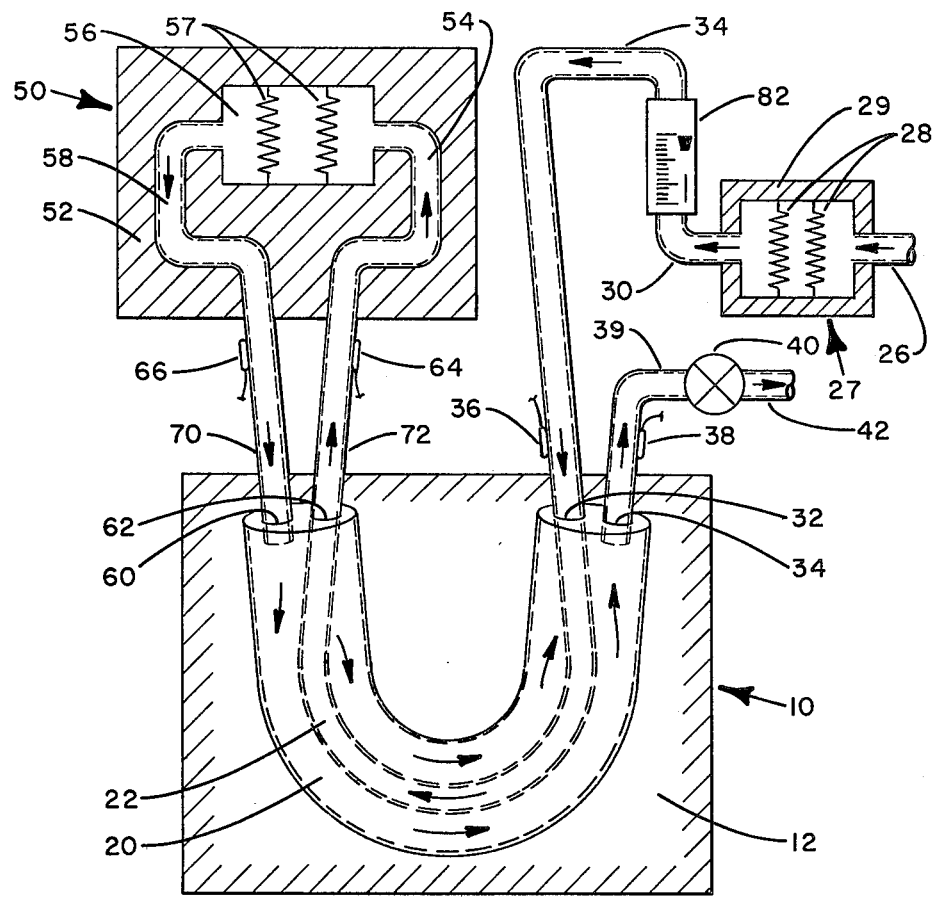
FIG. 1 is a schematic view of a tube in tube heat exchanger connected to appropriate equipment pursuant to the method and apparatus set forth herein.

The embodiment described herein will be directed to a coaxial tube in tube heat exchanger. The drawing shows a simple U-shaped heat exchanger but it is to be understood that these heat exchangers are typically helical or otherwise circuitous to include a plurality of loops forming a single flow path. It is further to be understood that although the preferred embodiment described herein tests a tube in tube heat exchanger that the method and apparatus described would have like applicability to any heat exchanger having two fluid flow paths in direct heat exchange relation with each other such that the mass flow through each would be constant.

Referring now to FIG. 1 there may be seen heat exchanger 10 having inner tube 22 surrounded by outer tube 20. Urethane insulation 12 surrounds the entire heat exchanger. Water supply 26 acts to supply water through preheater unit 27 having electric immersion heaters 28 and being insulated with insulation 29 such that the supply water is preheated to a certain temperature. The water is then conducted through connecting line 30 from preheater unit 27 to flow meter 82. Flow meter 82 is used to determine the flow rate of water through the system. Conduit 34 connects flow meter 82 to inner tube inlet 32. From there the water flows through inner tube 22 of the heat exchanger and is discharged through inner tube outlet 62 to connecting line 72. Connecting line 72 is connected between inner tube outlet 62 and heating unit 50 to conduct water into heater inlet 54. Water then flows to the heating area 56 with immersion heaters 57 before being discharged through heater discharge 58 to connecting line 70. From connecting line 70 the water is directed to outer tube inlet 60.

Heating unit 50 contains heaters 57 as well as insulation 52 to prevent heat energy transfer between the heaters and the ambient. Heating unit 50 further includes heating area 56, heater inlet 54 and heater discharge 58.

Water flows into outer tube 20 through outer tube inlet 60 and travels back through outer tube 20 surrounding inner tube 22 such that there is heat transfer between the water flowing through the inner and outer tubes. The water is then discharged from outer tube 20 through outer tube outlet 34 into conduit 39. From conduit 39 the water flows through regulating valve 40 for controlling the mass flow rate of the water through the heat exchanger and is directed to water discharge 42. Temperature sensor 36 ($T_{cin}$) is mounted in heat exchange relation with the water flowing through conduit 34 prior to inner tube inlet 32. Temperature sensor 64 ($T_{co}$) is connected to measure the temperature of the water flowing through connecting line 72 which is the water discharged from inner tube outlet 62. Temperature sensor 66 ($T_{hin}$) is connected to measure the temperature of the water flowing through connecting line 70, just prior to the water entering outer tube inlet 60. Temperature sensor 38 ($T_{ho}$) is connected to measure the temperature of the water flowing through conduit 39 just after the water exits outer tube outlet 34.

Figure 2:
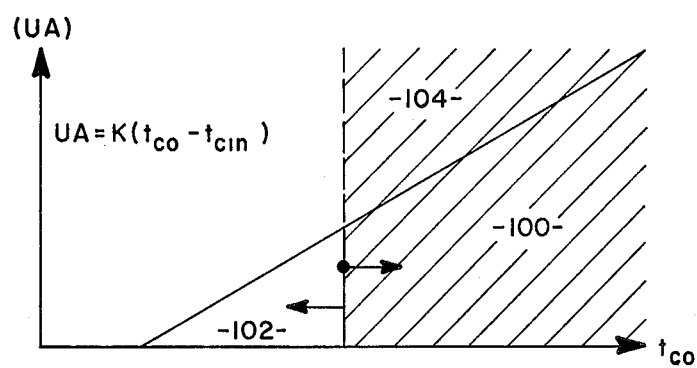
FIG. 2 is a graph indicating acceptable and unacceptable heat transfer performance according to the discharge temperature of the water from a tube of the heat exchanger.

FIG. 2 is a graph of the equation $$UA = K(T_{co} - T_{cin}) \quad \text{(Equation 1)}$$

where the ordinate of the graph is UA and the abcissa of the graph is $T_{co}$. UA, the heat transfer coefficient times the area of the heat exchanger measures the heat transfer performance of a heat exchanger. $T_{co}$ is the fluid exit temperature from the inner flow path.

A portion of the graph is shaded and labeled both 100 and 104. This portion is indicative of an exit water temperature from the inner tube exceeding a predetermined value being indicative that the heat exchanger has sufficient heat transfer between the inner and outer tubes to be acceptable for the desired application. Portion 100 is that portion where the exit temperature as measured by sensor 64 is equal to or greater than a predetermined value. The portion labeled 104 is that portion where the heat transfer rate, UA, is equal to or exceeds a predetermined value. The portion of the graph labeled 102 is that portion where the exit temperature ($T_{co}$) is unacceptably low and the heat exchanger would be rejected.

In order to determine the effective rate of heat transfer between the inner and outer tubes it may be calculated by the equation $$Q = UA(\Delta T) \quad \text{(Equation 2)}$$

where Q is the overall heat transfer rate, U is the overall coefficient of heat transfer, A is the heat transfer area and $\Delta T$ is the temperature change measured as the mean temperature difference between the inner and outer tubes. The heat transfer rate may also be expressed as:

$$Q = UA(\Delta T) = UA \frac{q}{mC_p} \quad \text{(Equation 3)}$$

where q is the heat energy added by heating unit 50, m is the mass flow rate and $C_p$ is the specific heat of water. This equation may be rewritten as $$UA = \frac{m^2 C_p^2}{q}(T_{co} - T_{cin}) \quad \text{(Equation 4)}$$

This equation may be rearranged as:

$$T_{co} = UA \frac{q}{m^2 C_p^2} + T_{cin} \quad \text{(Equation 5)}$$

Using the above formula and since the following factors are known:
q is equal to the energy input of heating unit 50.
m is the mass flow rate of the water through the heat exchanger.
$T_{cin}$ is the incoming temperature of the water controlled by preheater unit 27 to a known constant.
$C_p$ is the known specific heat of water which is one BTU per pound per degree Fahrenheit.

Hence, the only unknown to determine the performance of the heat exchanger, UA, is temperature $T_{co}$ (the temperature sensed at sensor 64).

Assuming a specific example where the energy input to heaters 57 is 3000 watts (10,239 BTU per hour), $C_p$ equals one BTU per pound per degree Fahrenheit and further assuming that $T_{cin}$ is 80 degrees Fahrenheit and that the volume flow rate is one half gallon per minute of water which is equal to a mass flow rate of 250 pounds per hour. Based on these assumptions the temperature rise $T_{cin}-T_{co}$ equals 10,239 BTU per hour divided by 250 pounds per hour and divided by one BTU per pound per degree Fahrenheit. Pursuant to these assumptions the temperature drop equals 41 degrees Fahrenheit. Additionally, using these same values in equation 4 it is determined that UA equals 6.1 times the quantity ($T_{co}$-$T_{cin}$). Since $T_{cin}$ is a constant then solving equation 4 with the measured value of $T_{co}$ will give the value of UA representative of the performance of the heat exchanger.

When using this apparatus as an incoming quality control tool the appropriate water connections are made and by simply measuring the temperature at temperature sensor 64 to determine $T_{co}$ it may be determined whether or not the heat exchanger is acceptable. If $T_{co}$ falls to the right within the area labeled 100 or 104 in FIG. 2 then the heat exchanger is acceptable. If the $T_{co}$ is less than that amount and falls within the region labeled 102 then it is unacceptable.

It is to be understood that the temperature change over both flow paths should be equal. Hence, the temperature change could be determined by subtracting $T_{ho}$ from $T_{hin}$. The inner flow path temperatures are referred to in all of the examples but the outer flow path temperatures could serve equally for this purpose. Additionally, pressure drop measurements over the flow path may be taken to verify the flow resistance along the flow path.

The invention has been described herein with reference to a particular embodiment. It is to be understood by those skilled in the art that variations and modifications can be effected within the spirit and scope of the invention.

What is claimed is:

1. A method of measuring the heat transfer performance of a tube in tube heat exchanger having an inner tube defining a first portion of a flow path and an outer tube defining a second portion of a flow path which comprises the serial steps of:
   insulating said heat exchanger from the external environment;
   supplying a heat transfer fluid to said inner tube of said heat exchanger at a known flow rate;
   passing said heat transfer fluid through said inner tube and out of said heat exchanger;
   adding heat energy at a known rate to said heat transfer fluid which has passed through said inner tube at a point external of said heat exchanger;
   directing said heated heat transfer fluid into said outer tube of said heat exchanger such that said heat transfer fluid flowing through said inner tube is in heat exchange relationship with said heated heat transfer fluid flowing through said outer tube; and
   determining the temperature change of said heat transfer fluid between an inlet and an outlet of one of said inner and outer tubes, said temperature change being indicative of the heat transfer rate between said inner and outer tubes.

2. The method as set forth in claim 1 and further comprising the step of:
   heating said heat transfer fluid prior to the step of supplying to provide said heat transfer fluid at a known temperature to the step of supplying.

3. The method as set forth in claim 2 wherein the step of determining the temperature change further comprises:
   sensing the temperature of said heat transfer fluid which has passed through said inner tube; and
   subtracting the known supplied heat transfer fluid temperature from the temperature determined by the step of sensing to determine the temperature change in said inner tube.

4. The method as set forth in claim 3 and further comprising the step of calculating the amount of heat energy transferred once the temperature of said heat transfer fluid received is known according to the equation:

$$UA = \frac{m^2 C_p^2}{q} (T_{co} - T_{cin})$$

where
U is the overall heat transfer coefficient
A is the area of said heat exchanger
m is the known mass of said heat transfer fluid flow
$C_p$ is the known specific heat of water
q is the known amount of energy added to said heat transfer fluid
$T_{cin}$ is the known temperature of said heat transfer fluid entering said inner tube; and
$T_{co}$ is the temperature of said heat transfer fluid leaving said inner tube as detected by the step of sensing.

5. A method of determining the rate of heat transfer between a first fluid flow path and a second fluid flow path which is in heat exchange relationship with said first fluid flow path which comprises the serial steps of:
   insulating said first and second flow paths from the external environment;
   supplying water at a known temperature and flow rate to said first fluid flow path;
   receiving said water which has passed from said first fluid flow path;
   adding heat energy at a known rate to said water received from said first fluid flow path at a point intermediate said first and second fluid flow paths;
   directing the now heated water from the step of adding heat energy into said second fluid flow path; and
   measuring the temperature of said water discharged from said first fluid flow path, said temperature being indicative of the rate of heat transfer from said second flow path to said first flow path.

6. The method as set forth in claim 5 and further comprising the step of calculating the amount of heat energy transferred according to the equation:

$$UA = \frac{m^2 C_p^2}{q} (T_{co} - T_{cin})$$

where
U is the overall heat transfer coefficient
A is the area of heat exchange
m is the mass of water
$C_p$ is the specific heat of water
q is the amount of energy added to said water
$T_{co}$ is the temperature of said water being discharged from said first fluid flow path; and
$T_{cin}$ is the temperature of said water entering said first fluid flow path.

7. The method as set forth in claim 5 wherein the step of supplying water includes heating said water to a predetermined temperature and regulating the volume flow of said water to a preselected flow rate.

8. Apparatus for use in evaluating the performance of a tube in tube heat exchanger having a first flow path and a second flow which is in a heat exchange relationship with said first flow path which comprises:

means for insulating said heat exchanger from the external environment;

means for connecting a water supply to said first flow path of said heat exchanger;

means for receiving water passing from said first flow path of said heat exchanger and for directing said water into said second flow path of said heat exchanger, said means for receiving water including a heat source for supplying heat energy at a known rate to said water at a point intermediate said first and second flow paths; and temperature detection means for ascertaining the temperature change of said water along one of said first and second flow paths of said heat exchanger, said temperature change being indicative of the heat energy transferred between said first and second flow paths of said heat exchanger.

9. The apparatus as set forth in claim 8 and further comprising:

inlet heater means for adding heat energy to said water supplied to said first flow path to maintain said water at a constant temperature; and wherein said temperature detection means includes a temperature sensor connected to sense the temperature of said water being discharged from said first flow path such that the change in temperature between said constant temperature and the sensed discharge temperature is indicative of the performance of said heat exchanger.

10. The apparatus as set forth in claim 8 and further comprising:

a water flow regulator to provide a constant mass flow rate of said water through said heat exchanger.

11. The apparatus as set forth in claim 8 wherein said heat source comprises:

a heating unit with a water flow path therethrough including a heating area having electric immersion heaters for supplying heat energy to said water flowing through said unit, said unit further being insulated to reduce heat transfer to the ambient from said heating unit.

* * * * *